3,369,875
PROCESS FOR TREATING PHOSPHATE ORES TO OBTAIN METAL SULFIDES AND PHOSPHORUS SULFIDES
Mark M. Woyski, La Habra, Calif., Lamar T. Royer, Oak Ridge, Tenn., and Robert M. Healy, Warrenville, Ill., assignors to American Potash & Chemical Corporation, Los Angeles, Calif., a corporation of Delaware
No Drawing. Filed Oct. 30, 1964, Ser. No. 407,876
11 Claims. (Cl. 23—318)

This invention relates to the treatment of ores. More particularly, this invention relates to a process for the efficiency recovery of valuable constituents from phosphate ores.

A large number of phosphate ores, which contain metallic elements, are known. Previously, considerable difficulty had been encountered in recovering the metallic and phosphorus values from these ores.

Generally, it had been considered impractical to simultaneously recover both the phosphorus and metallic values from phosphate ores. Also, previous processes for the treatment of phosphate ores generally required excessive amounts of expensive reagents.

Phosphate ores had been reacted with carbon alone to eliminate the phosphorus content. In general, this required temperature of 1,500° C. or higher which are ordinarily attainable only in electric furnace operations.

These and other difficulties of the prior art are overcome according to this invention.

Broadly, this invention is embodied in a process which comprises heating an intimate admixture of a carbon source, a sulfur source, and a phosphate ore, which ore contains at least one metallic element. The heating is continued for a period of time sufficient to recover, as the corresponding metallic sulfides, the major amount of the metallic elements in the phosphate ore. This process is particularly desirable, because, simultaneously, with the formation of the metallic sulfides, the phosphorous content of the phosphate ore is reduced to either elemental phosphorus or phosphorous sulfide.

The phosphorus values are generally distilled off from the reaction mixture, which facilitates their recovery in a relatively pure form. Recovery of these phosphorus values is an important factor in the commercial success of this process.

When heated carbon is in contact with the vaporous reaction product of this process, phosphorus is generally recovered as elemental phosphorus rather than phosphorus sulfide. Preferably, when heated carbon is used, it is incorporated in the reaction mixture with the phosphate ore.

This process is very useful for recovering the phosphorus, thorium and rare earth values from phosphate ores which contain these values.

The metallic sulfide product obtained from this process generally is in the form of a dry, free-flowing powder. This physical form of the product facilitates its further handling and treatment.

The vaporous phosphorus values produced by the reaction in this process are carried out of the reaction zone in the vaporous reaction products. Conveniently, the vaporized phosphorus values are recovered by condensing them out of the vaporous reaction products. The process of this invention is very efficient, resulting in the recovery of substantially all of the phosphorus present in the initial ore.

Preferably, the sulfur values present in the metallic sulfide product are recovered and recycled for reuse in this process. This recovery can be accomplished, for example, by treating the sulfide product with dilute acids. This treatment converts the sulfur values to hydrogen sulfide. This hydrogen sulfide may then be reused as such, or it may be converted, for example, by reaction with elemental carbon to carbon disulfide, or it may be converted to free sulfur. If desired the metallic sulfide product can be roasted to recover the sulfur values as sulfur dioxide.

The present process is very flexible and may be carried out in a match, semi-batch or continuous operation. This process may be carried out in a wide variety of apparatus including, for example, rotary kilns, static bed reactors, fluidized bed reactors, and the like. Preferably, this process is carried out in a fluidized bed reactor because the most rapid and complete reactions are obtained in this apparatus.

Preferably, provisions are made for agitating the particulate phosphate ore during the reaction to insure that there is complete contact between the ore and the carbon and sulfur sources.

The term "carbon source" as used herein includes the solid, liquid and vapor forms of both elemental and combined carbon. Typical carbon sources suitable for use in this process include, for example, elemental carbon including carbon black, charcoal, coke and the like; lower hydrocarbons such as methylene, ethylene, propylene, butenes, isopentenes, acetylene, methane, ethane, propane, isopropane, butane, cyclohexane, cyclopentane, natural gas and the like; aromatic hydrocarbons such as benzene, toluene, xylenes, naphthalene and the like; carbon-oxygen compounds as such carbon monoxide, carbon dioxide, synthesis gas and the like; combined carbon and sulfur compounds such as carbon disulfide, carbon oxysulfide and the polymers of carbon and sulfur; mercaptans such as methyl, ethyl, propyl and butyl mercaptans; the sulfides such as methyl sulfide and alkyl sulfide and the sulfites such as dimethyl sulfite and the like.

The term "sulfur source" as used herein is intended to include the solid, liquid and vapor forms of elemental sulfur, hydrogen sulfide, carbon disulfide, carbon oxysulfide and the polymers of carbon and sulfur; the mercaptans such as methyl, ethyl, propyl and butyl mercapstans; the sulfides such as methyl sulfide and alkyl sulfide and the sulfites such as dimethyl sulfite and the like.

Preferred carbon sources include elemental carbon, carbon monoxide and carbon disulfide.

Preferred sulfur sources include elemental sulfur and carbon disulfide.

In general, those sulfur and carbon sources which contain hydrogen are less preferred because the reaction products produced when hydrogen is present include hydrogen sulfide. Hydrogen sulfide is less desirable because the high stability of hydrogen sulfide results in incomplete utilization of the sulfur values. Also, hydrogen sulfide is toxic and combustible.

When carbon disulfide is used in this process, it need not be supplied as such to the process. It may be prepared in situ, by the reactions, for example, of carbon and sulfur, sulfur and natural gas, hydrogen sulfide and carbon, or the like. When carbon disulfide is to be prepared in situ, the reactants for its preparation are admixed with the particulate phosphate ore in approximately those stoichiometric amounts required to generate the desired amount of carbon disulfide. Large excesses of one reactant or another, however, may be used, and, in general, are not detrimental to the process.

In selecting carbon and sulfur sources it is necessary to insure that the combined carbon and sulfur sources have sufficient reducing capacity to combine with at least a portion of the oxygen in the ore. For example, the combination of only sodium sulfate and sodium carbonate is not satisfactory for use in this process. Admixtures containing sodium sulfate and sodium carbonate along with other carbon and sulfur sources are, however, satisfactory if the overall composition of the admixture is such that it supplies reducing conditions to the reactions.

This process is applicable to the phosphate ores in general and is particularly useful in treating the phosphate ores, identified as monazite, triphylite, pyromorphite, lithiophilite, amblygonite, apatite, lazulite, wavellite, variscite and the like. The specific metallic elements which are contained in these phosphate ores, and which can be converted to the sulfide by this process, include the rare earths, thorium, lithium, calcium, lead, aluminum, magnesium and the like. Advantageously, not only are the metallic constituents in these phosphate ores converted to readily recoverable sulfides, but high yields of phosphorus are also recovered from these phosphate ores.

It will be understood that the term "rare earth" as used herein includes: those elements of the lanthanide series, having atomic numbers from 57 through 71, inclusive, and the elements yttrium and scandium which may be present in minor amounts in rare earth ores. Conveniently, the term "rare earth" is abbreviated "Re."

The vaporous reaction products generally include carbon disulfide, sulfur, phosphorus compounds, elemental phosphorus, and the like. The exact composition of these gaseous products depends upon the composition of the reactants and the impurities in the ore. These gases are preferably passed into a condenser where the phosphorus values are collected. Any sulfur or sulfur-containing compounds in the exit gases preferably are recovered and the sulfur values are recycled.

Since this process provides the metallic values in the convenient form of the corresponding metallic sulfide, further treatment of these sulfides to recover the metallic values in any form desired is facilitated. For example, the metallic sulfides may be oxidized to yield the corresponding oxides. Alternatively, the sulfide product may be reacted with dilute acids to produce the corresponding metallic salt of the dilute acid. If a mixture of metallic elements are present in the phosphate ore, as, for example, in monazite, further separation procedures may be applied to recover the individual metallic elements.

In the instant specification, appended claims and following specific examples, all parts and percentages are by weight unless otherwise indicated. The following examples are set forth to further illustrate, not to limit, the invention, whereby those skilled in the art may understand better the manner in which the present invention can be carried into effect.

EXAMPLE I

This example is illustrative of the reaction of carbon disulfide with monazite ore to produce the sulfides of thorium, rare earths and phosphorus.

The monazite ore used in this example contains a total rare earth and thorium content of about 69 weight percent, expressed as the oxide, of which about 9.5 weight percent is $ThO_2$ and about 59.5 weight percent is $Re_2O_3$. This ore also contains about 3 weight percent oxides of Si, Fe, Ca and Mg and about 26.5 weight percent of phosphorus, expressed as $P_2O_5$. This ore has a particle size of −65+150 mesh (U.S. Standard). Monazite ore having a particle size of −325 mesh is produced by ball milling the −65+150 mesh ore.

The apparatus used in this example consists of a 1-inch diameter quartz tube 24 inches long. This tube is positioned in an 18-inch long tube furnace. The ore charge is placed in the middle of the reactor tube. Carbon disulfide vapor is generated in a separate flask and introduced into the tube reactor in the vapor phase. The exiting gas stream from the tube reactor passes into a heated flask maintained at about 90° C.–120° C. A condenser connects the heated flask to a calibrated graduate. The unreacted carbon disulfide in the exiting vaporous reaction product is condensed in this condenser and collected in the calibrated graduate. The remaining more volatile gases generated in the reaction pass through another condenser at the top of the carbon disulfide collecting graduate and are collected over water. The entire system is sealed from the atmosphere.

In this example, the thorium and rare earth values and phosphorus are converted, by the reaction of carbon disulfide with the monazite ore, to the corresponding sulfides. The thorium and rare earth sulfides are present in the tube reactor as a dry free-flowing powder. This sulfide product is subjected to acid digestion by adding it to about 150 mole percent of the stoichiometric amount of about 3 N acid. The resulting acidic admixture is heated and filtered. The filtrate is precipitated as the oxalate, ignited and weighed. The phosphorus pentasulfide produced in this reaction condenses in the exit end of the tube reactor and in the heated flask.

The results obtained in the several runs carried out in this example are set forth in the table below:

TABLE

| Run No. | A | B | C | D | E | F |
| --- | --- | --- | --- | --- | --- | --- |
| Starting material | [1] 14.08 | [2] 4.22 | [2] 50 | [3] 30.7 | [2] 30 | [2] 30 |
| Weight of solid reaction product, grams | 13.5 | 3.49 | 42.6 | 30.5 | 29.4 | 23.7 |
| Reaction temperature, °C | 950 | 950 | 950 | 950 | 720 | 970–980 |
| Reaction time, hours | 2 | 2 | 2 | 2 | [4] 70 | 3 |
| Weight percent of insoluble residue on starting monazite | 62 | 5.3 | 55 | 9 | 98 | 8.2 |
| Weight percent of $ThO_2$ and $Re_2O_3$ recovery on oxide content in starting monazite | 25 | 95.6 | 53 | [5] 97–99 | 2.7 | 93 |

[1] Grams of monazite (65 to 150 mesh) in a briquette form containing 1% C.
[2] Grams −325 mesh monazite.
[3] Grams of product from Run C.
[4] Minutes.
[5] Total for Runs C and D.

The stoichiometric examination of the reaction products shows the principal reaction taking place in this example to be as follows:

$$2RePO_4 + 8CS_2 \rightarrow Re_2S_3 + P_2S_5 + 8CO + 8S$$

The inclusion of carbon in the monazite starting materials of Run F, above, results in the production of elemental phosphorus and the sulfides of thorium and rare earths.

EXAMPLE II

This example is illustrative of the generation of carbon disulfide in situ from the reactants, carbon and sulfur, to produce elemental phosphorus and the sulfides of thorium and rare earths.

Indian monazite is used as the ore in this example. This is the same ore described in Example I, above. This monazite ore has a particle size which is less than 325 mesh.

The reactor used in this example consists of a quartz tube having a ¾-inch inside diameter. This tube is 32 inches long. This tube is mounted vertically and about the central 18 inches of the tube is inserted into an 18-inch long resistance heating element. The heating element is surrounded by insulating brick and controlled with a variable transformer. A graphite support plug is inserted through the bottom of the tube. This plug is level with the bottom of the heating element and supports the reaction bed which is constructed as follows, from bottom to top:

(a) A 1⅓-inch layer of coarse coke.
(b) A ½-inch layer of −20 mesh coke.
(c) A 6¼-inch layer of mixed monazite ore and carbon, 35 grams of each.
(d) A 10¼-inch layer of carbon, 77 grams.

A thermocouple is inserted into the top carbon layer. An inlet for an argon gas sweep is provided at the top of the quartz tube. Discharged gases exiting from the bottom of the quartz tube are first condensed in a flask which is maintained at room temperature. Those gases which do not condense in this flask are passed through a Dry Ice-acetone trap. Vapor which passes through this trap is measured with a wet test meter and then vented.

About .44 grams of vaporized sulfur is supplied to the top of the reaction bed at a uniform rate throughout the reaction. The bed temperature is established at and maintained between about 920° C. and 1,120° C. for a period of 20 hours. During this period, the reaction bed is swept continuously with argon. Elemental phosphorus droplets condense as they leave the hot zone of the tube. These droplets ignite in air when the tube is opened.

Analysis of the reaction products indicates that approximately 95 weight percent of the phosphorus has been removed from the monazite starting material.

Stoichiometric examination of the reaction products indicates that the reaction in this example takes place according to the equation:

$$2RePO_4 + 8C + 3S \rightarrow Re_2S_3 + 8CO + 2P$$

EXAMPLE III

This example is illustrative of the application of this process to apatite ore for the purpose of producing phosphorus sulfide.

Apatite, commonly known as phosphate rock, is the ore used in this example. This ore has the following weight percent analysis:

| | Percent |
|---|---|
| Calcium phosphate | 76.73 |
| Silica | 3.95 |
| Calcium carbonate | 6.8 |
| Calcium fluoride | 7.95 |
| Combined water | 2.23 |
| Not identified | 2.34 |
| Passing 100 mesh (U.S. Standard) | 91.00 |

About 25 grams of this phosphate rock are placed in a silica boat and the boat is inserted in a quartz tube furnace. This phosphate rock is heated to a temperature of about 820° C. by means of the furnace, and carbon disulfide is introduced into the tube. Almost immediately, droplets of dark red liquid begin to condense at the cold exit end of the tube. The introduction of carbon disulfide is continued for a period of about 6 hours while the temperature of the phosphate rock is maintained at from about 820° C. to 1,000° C. During this period of time, about 88 grams of carbon disulfide are introduced into the tube furnace. The dark red liquid continues to accumulate throughout this 6 hour reaction period.

Analysis of the solid residue in the silica boat at the end of the reaction shows that it contains about 1.7% $P_2O_5$ with the remainder being largely calcium sulfide. The red liquid condensate solidifies on cooking. This red solid is identified at $P_2S_5$ containing an excess of sulfur.

EXAMPLE IV

This example is illustrative of the application of this process to phosphate rock, in the presence of carbon, for the purpose of producing elemental phosphorus.

The phosphate rock used in this example is the same as that described in Example III, above.

The apparatus used in this example consists of a 36-inch quartz tube having a 1-inch outside diameter. This quartz tube is heated over the middle 18 inches of its length by a tube furnace. Phosphate rock having a size of less than 325 mesh (U.S. Standard) is mixed with calcined charcoal having a particle size of less than 60 mesh (U.S. Standard). The phosphate rock and charcoal, respectively, are mixed in a weight ratio of about 2 to 1 and the mixture is placed inside the central section of the quartz tube. Carbon disulfide is introduced into the quartz tube through a capillary tube. Vaporous reaction products are conducted away from the reactor tube into conventional collection and measurement devices. The temperature of the phosphate rock-charcoal reaction bed is monitored with a thermocouple inserted in the bed.

The reaction bed is composed of about 114 grams of phosphate rock and about 57 grams of charcoal. Carbon disulfide is supplied to the reactor for a period of about 12 hours. During this period of time, about 86 grams of carbon disulfide are supplied to the reaction tube and the temperature of the reaction bed is maintained at between about 950° C. and 1,050° C. The reaction is not carried to completion. The solid residue remaining in the tube weighs about 138 grams. About 9 grams of elemental phosphorus are collected during the reaction. At about 1,050° C., the exit gas exclusive of the phosphorus vapor, has a composition in mole percent as follows:

| | Percent |
|---|---|
| Carbon monoxide | 65.2 |
| Carbon dioxide | 7.8 |
| Carbon oxysulfide | 12.1 |
| Carbon disulfide | 14.9 |
| Silicon tetrafluoride | trace |

The calcium sulfide product, which is a dry, free-flowing powder, is treated in situ with carbon dioxide to produce calcium oxide (lime) and carbon disulfide. The carbon disulfide is suitable for reuse in treating more phosphate rock.

The sulfur values contained in the calcium sulfide may be recovered for reuse by treating the calcium sulfide with any one of carbon dioxide—to produce carbon disulfide, sulfur dioxide—to produce sulfur, or oxygen—to produce sulfur dioxide.

Example III is repeated using pyromorphite in place of apatite, and satisfactory results are obtained in recovering both the lead and phosphorus values from this ore.

Example II is repeated using an excess of hydrogen sulfide in place of the sulfur used in that example. The hydrogen sulfide is passed into the reaction mixture during the reaction. Substantially all of the phosphorous, thorium and rare earth values in the monazite ore are recovered using this procedure.

Example II is repeated using natural gas in place of the carbon used in that example. The natural gas is passed continuously through the bed throughout the reaction period. Satisfactory results are achieved using this procedure.

As illustrated in the foregoing examples, satisfactory results are obtained when an admixture of a carbon source, a sulfur source and particulate phosphate ore is heated to reaction temperatures ranging from about 750° C. to 1,500° C., preferably from about 800° C. to 1,200° C.

The amounts of carbon and sulfur sources used to effect the treatment of phosphate ores according to this process, vary considerably from approximately stoichiometric amounts to several hundred times the stoichiometric amounts required to react with the phosphate ore. The geometry of the reaction system strongly influences the carbon and sulfur source requirements. For example, large excesses of these reactants are required to produce complete reaction when the ore particles are relatively large or when they are not adequately mixed with reactants.

Preferably, the phosphate ore is finely divided so as to insure intimate contact with the carbon and sulfur sources. Satisfactory results are obtained using particulate ores having particle sizes ranging from about one micron or less to one inch or more. Very satisfactory results are also obtained using pellets or briquettes containing phosphate ore. Conveniently the ore and carbon source in the form, for example, of petroleum tars, pitch and the like are incorporated together in one pellet or briquette; the term "particulate" is intended to include pellets and briquettes containing phosphate ore.

The present process is capable of very efficient operation and results in the recovery of substantially all of the phosphorus and metallic elements contained in the phosphate ore. This process is accomplished by treating the phosphate ore for a period of time sufficient to convert at least the major amount of its metallic elements to the corresponding sulfides. The time required to accomplish this conversion varies widely, depending, for example, on such parameters as the temperature, ore particle size, thoroughness of admixture between the carbon disulfide and the ore and the like. In general, this period of time ranges from about 10 seconds or less to several hours, say 20 hours or more.

As will be understood by those skilled in the art, what has been described are preferred embodiments of the invention; however, many modifications, changes and substitutions can be made therein without departing from the scope and the spirit of the following claims.

What is claimed is:

1. A process comprising: heating a particulate phosphate ore which ore contains a metallic element in the form of a phosphate, said ore being in intimate contact with carbon disulfide to volatilize phosphorus values from said ore and convert metallic values from said ore to the corresponding sulfide.

2. A process comprising: heating a particulate apatite ore which ore contains a metallic element in the form of a phosphate, said ore being in intimate contact with carbon disulfide to volatilize phosphorus values from said ore and convert metallic values from said ore to the corresponding sulfide.

3. A process comprising: heating a particulate monazite ore which ore contains a metallic element in the form of a phosphate, said ore being in intimate contact with a compound selected from the group consisting of sulfur, hydrogen sulfide, carbon disulfide, carbon oxysulfide and a carbon source, the combined sulfur and carbon sources having sufficient reducing capacity to combine with at least a portion of the oxygen in said ore, to volatilize phosphorous values from said ore and convert metallic values from said ore to the corresponding sulfide.

4. A process comprising: heating a particulate monazite ore which ore contains a metallic element in the form of a phosphate, said ore being in intimate contact with a compound selected from the group consisting of sulfur, hydrogen sulfide, carbon disulfide, carbon oxysulfide and carbon to volatilize phosphorus values from said ore and convert metallic values from said ore to the corresponding sulfide.

5. A process comprising: heating a particulate monazite ore which ore contains a metallic element in the form of a phosphate, said ore being in intimate contact with a compound selected from the group consisting of sulfur, hydrogen sulfide, carbon disulfide, carbon oxysulfide and natural gas to volatilize phosphorus values from said ore and convert metallic values from said ore to the corresponding sulfide.

6. A process comprising: heating a particulate monazite ore which ore contains a metallic element in the form of a phosphate, said ore being in intimate contact with sulfur and a carbon source, the carbon source having sufficient reducing capacity to combine with at least a portion of the oxygen in said ore, to volatilize phosphorus values from said ore and convert metallic values from said ore to the corresponding sulfide.

7. A process comprising: heating a particulate monazite ore which ore contains a metallic element in the form of a phosphate, said ore being in intimate contact with sulfur and carbon to volatilize phosphorous values from said ore and convert metallic values from said ore to the corresponding sulfide.

8. A process comprising: heating a particulate monazite ore which ore contains a metallic element in the form of a phosphate, said ore being in intimate contact with carbon disulfide and a carbon source to volatilize phosphorous values from said ore and convert metallic values from said ore to the corresponding sulfide.

9. A process comprising: heating a particulate monazite ore which ore contains a metallic element in the form of a phosphate, said ore being in intimate contact with carbon disulfide and carbon to volatilize phosphorus values from said ore and convert metallic values from said ore to the corresponding sulfide.

10. A process comprising: heating a particulate monazite ore which ore contains a metallic element in the form of a phosphate, said ore being in intimate contact with carbon disulfide to volatilize phosphorus values from said ore and convert metallic values from said ore to the corresponding sulfide.

11. A process comprising: heating a particulate monazite ore which ore contains a metallic element in the form of a phosphate, said ore being in intimate contact with hydrogen sulfide and a carbon source, the carbon source having sufficient reducing capacity to combine with at least a portion of the oxygen in said ore, to volatilize phosphorus values from said ore and convert metallic values from said ore to the corresponding sulfide.

References Cited
UNITED STATES PATENTS

| | | | |
|---|---|---|---|
| 605,378 | 6/1898 | Blackmore | 23—134 |
| 1,816,842 | 8/1931 | Haglund | 23—134 X |
| 1,908,091 | 4/1933 | White | 23—134 |
| 1,919,310 | 7/1933 | Suchy et al. | 23—134 X |
| 1,941,609 | 1/1934 | Macready | 23—134 |
| 1,941,610 | 1/1934 | Macready | 23—134 |
| 3,313,601 | 4/1967 | Marvin | 23—134 |

OTHER REFERENCES

Mellor, "Comprehensive Treatise on Inorganic and Theoretical Chemistry," Vol. 7, p. 239, Longmans, Green and Co. (1925).

CARL D. QUARFORTH, *Primary Examiner.*

L. DEWAYNE RUTLEDGE, *Examiner.*

S. TRAUB, M. J. McGREAL, *Assistant Examiners.*